March 15, 1960 D. A. DEL SOLE 2,928,509
HYDRAULIC BRAKE
Filed Aug. 29, 1957 9 Sheets-Sheet 1

From Reservoir

To Pressure Guage, Control Valve & Reservoir

To Motor Intake Manifold

INVENTOR
Dominick A. Del Sole
BY
ATTORNEY

INVENTOR
Dominick A. Del Sole

March 15, 1960 D. A. DEL SOLE 2,928,509
HYDRAULIC BRAKE

Filed Aug. 29, 1957 9 Sheets-Sheet 4

INVENTOR
Dominick A. Del Sole
BY
ATTORNEY

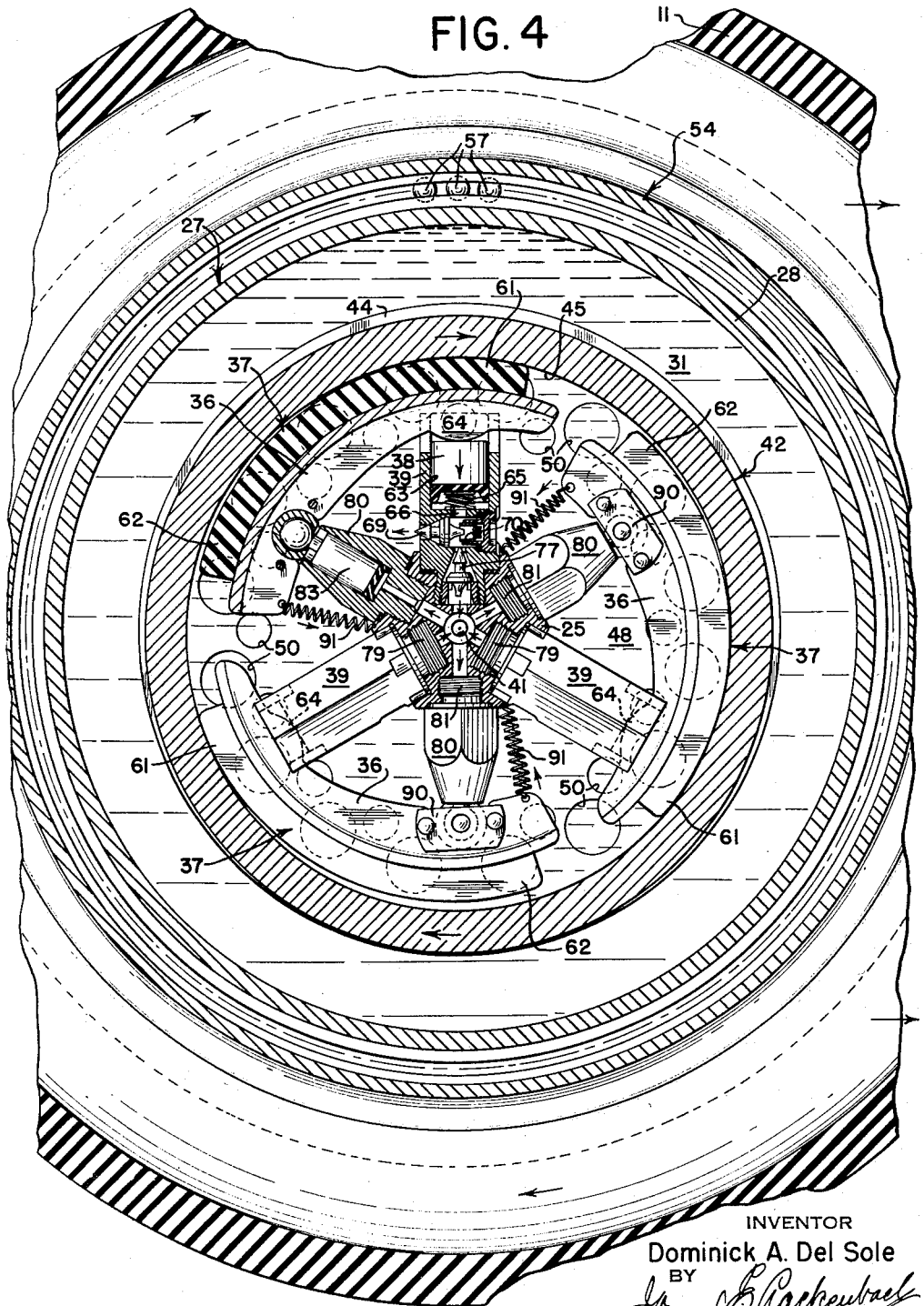

March 15, 1960 D. A. DEL SOLE 2,928,509
HYDRAULIC BRAKE

Filed Aug. 29, 1957 9 Sheets-Sheet 6

INVENTOR
Dominick A. Del Sole
BY
ATTORNEY

March 15, 1960  D. A. DEL SOLE  2,928,509
HYDRAULIC BRAKE
Filed Aug. 29, 1957  9 Sheets-Sheet 7
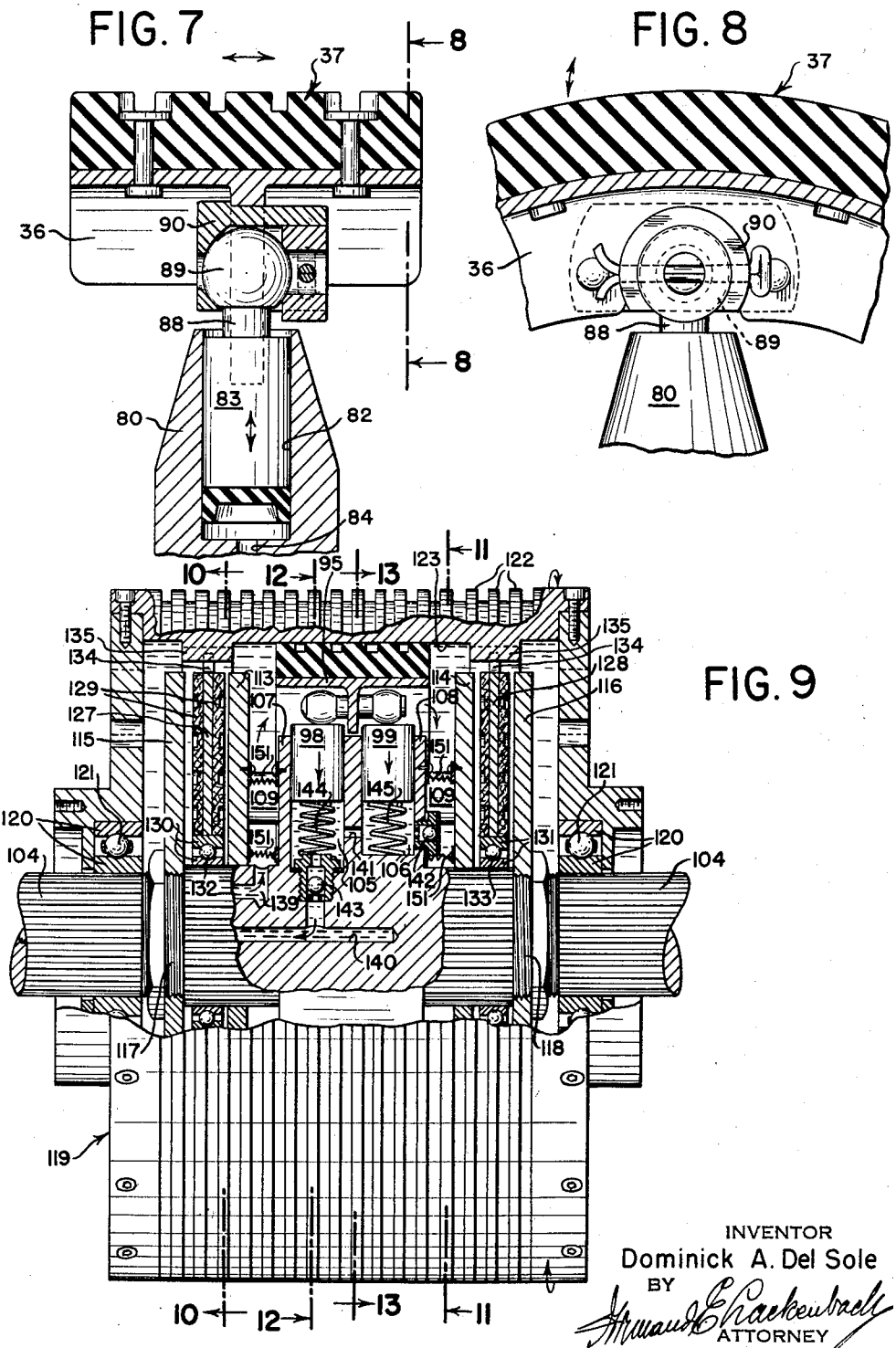
INVENTOR
Dominick A. Del Sole
BY
ATTORNEY March 15, 1960     D. A. DEL SOLE     2,928,509
HYDRAULIC BRAKE
Filed Aug. 29, 1957     9 Sheets-Sheet 8

INVENTOR
Dominick A. Del Sole
BY
*Armand E. Lachenbach*
ATTORNEY

March 15, 1960     D. A. DEL SOLE     2,928,509
HYDRAULIC BRAKE

Filed Aug. 29, 1957     9 Sheets-Sheet 9

INVENTOR
Dominick A. Del Sole
BY
ATTORNEY

United States Patent Office 2,928,509
Patented Mar. 15, 1960

2,928,509

HYDRAULIC BRAKE

Dominick A. Del Sole, New York, N.Y.

Application August 29, 1957, Serial No. 680,981

11 Claims. (Cl. 188—152)

This invention relates to hydraulic braking systems, providing novel apparatus of this character which may be adapted for use in a great variety of applications, particularly where substantial loads are involved in the braking operation.

The general concept of the employment of hydraulic principles in the braking of motion in moving bodies is, of course, not new. Through utilization of hydraulics the once formidable task of retarding or stopping motion of massive bodies has become simple, and reduced the extent of human participation in such act of retardation or stopping merely to that of control.

Yet known hydraulic braking systems often do not function satisfactorily where the magnitude of the mass is much greater than that which has been involved in the past. Further, the rapidity of cessation of motion in bodies of mass which are customarily dealt with is often unsatisfactory.

Accordingly, it is the primary object of the present invention to provide a hydraulic braking system which affords positive rapid stoppage in moving bodies, which system will be operative even with masses having a magnitude out of the ordinary. In achieving this object reliance is placed upon a system wherein, during motion, a circulation of fluid is maintained, braking resulting when such circulation is interrupted.

Another object herein is to procure braking by the frictional interaction of rotating and stationary components, frictional force being applied over a very wide area.

Still another object herein is to provide for long operating life of components affected by friction by providing self adjusting expedients to compensate for erosion of frictional surfaces.

A still further object is to show a hydraulic braking apparatus having the advantages hereinabove mentioned, as adapted for use in a spinning wheel such as might find special application with aircraft. It will be understood that though I describe my novel brake as used in aircraft, that such description is exemplary only, and my brake may be effectively used in automobiles, drill presses, punch presses, cranes, hoists, etc.

How these and many other objects are to be implemented will become clear through a consideration of the accompanying drawings wherein.

Figure 1:
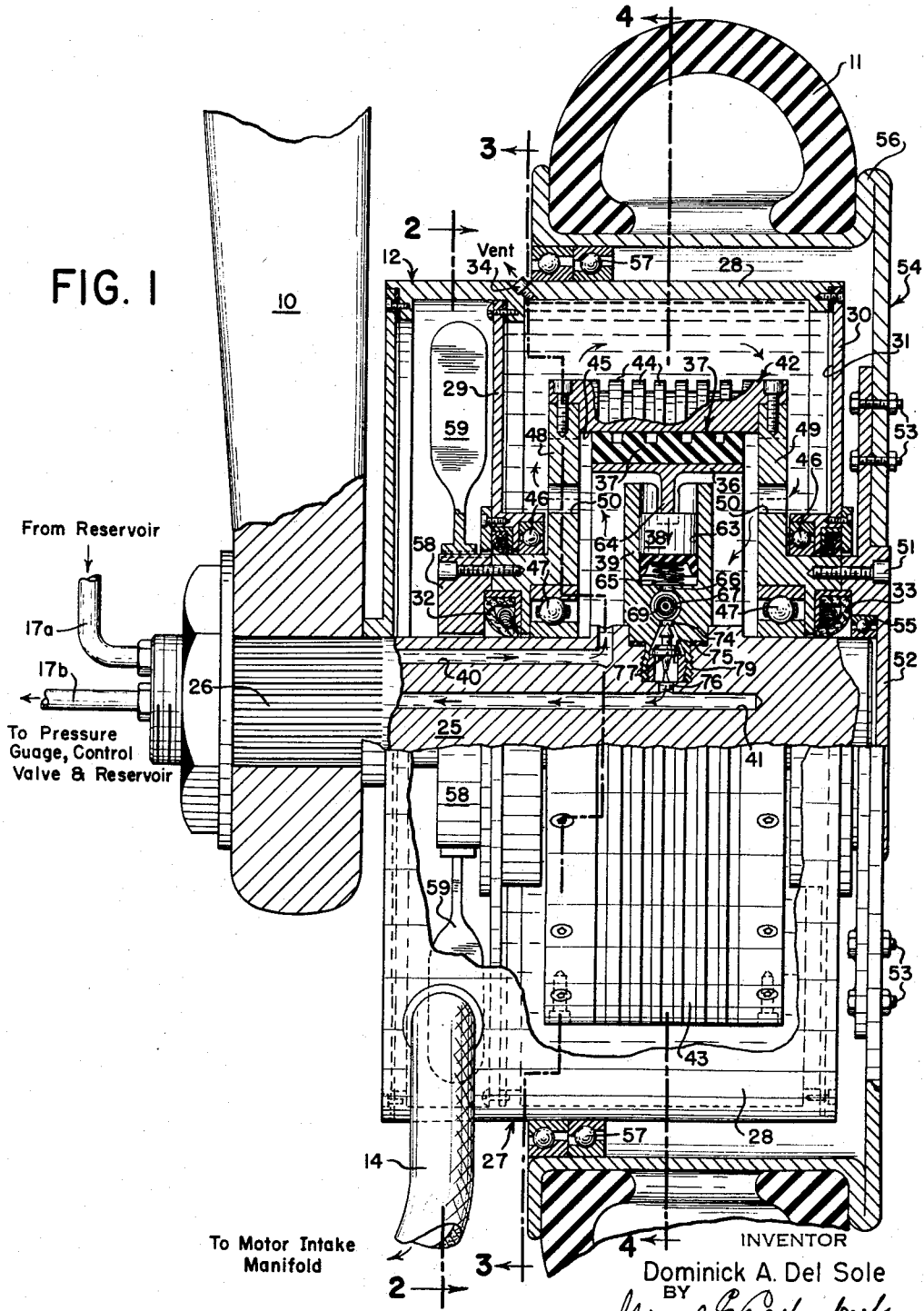
Fig. 1 is a front elevation, partially in section, of one embodiment of my braking mechanism as mounted on a shaft.
Figure 5:
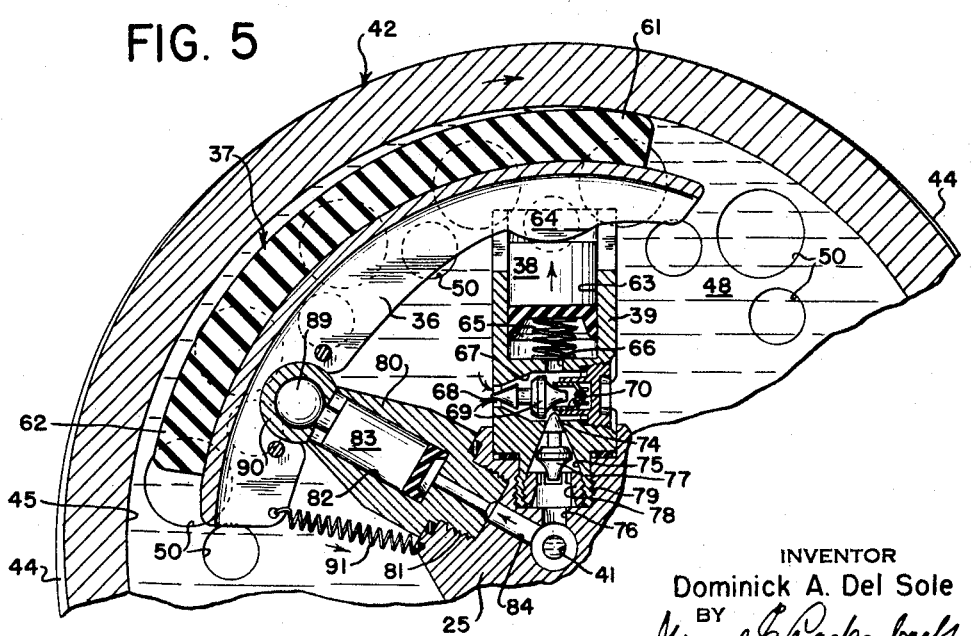
Figure 2:
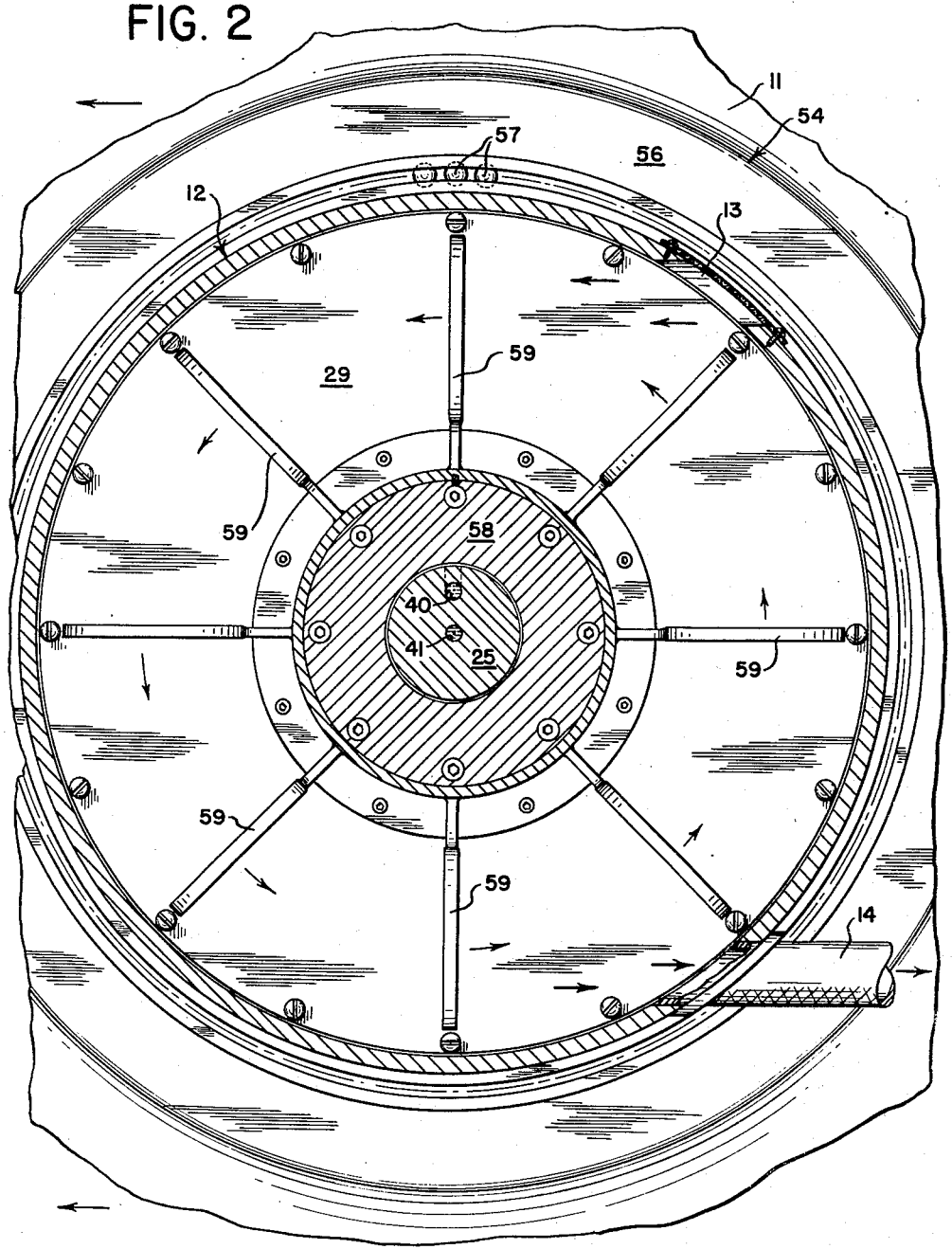
Figure 3:
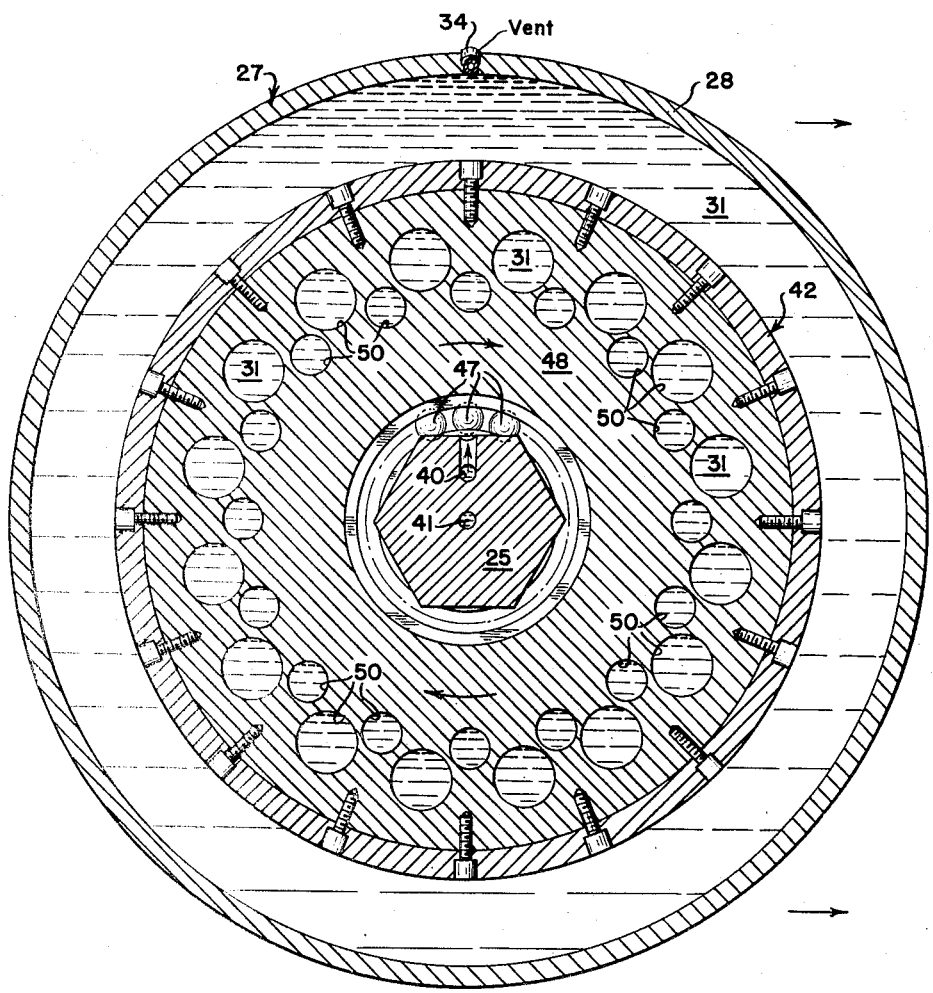
Figure 6:
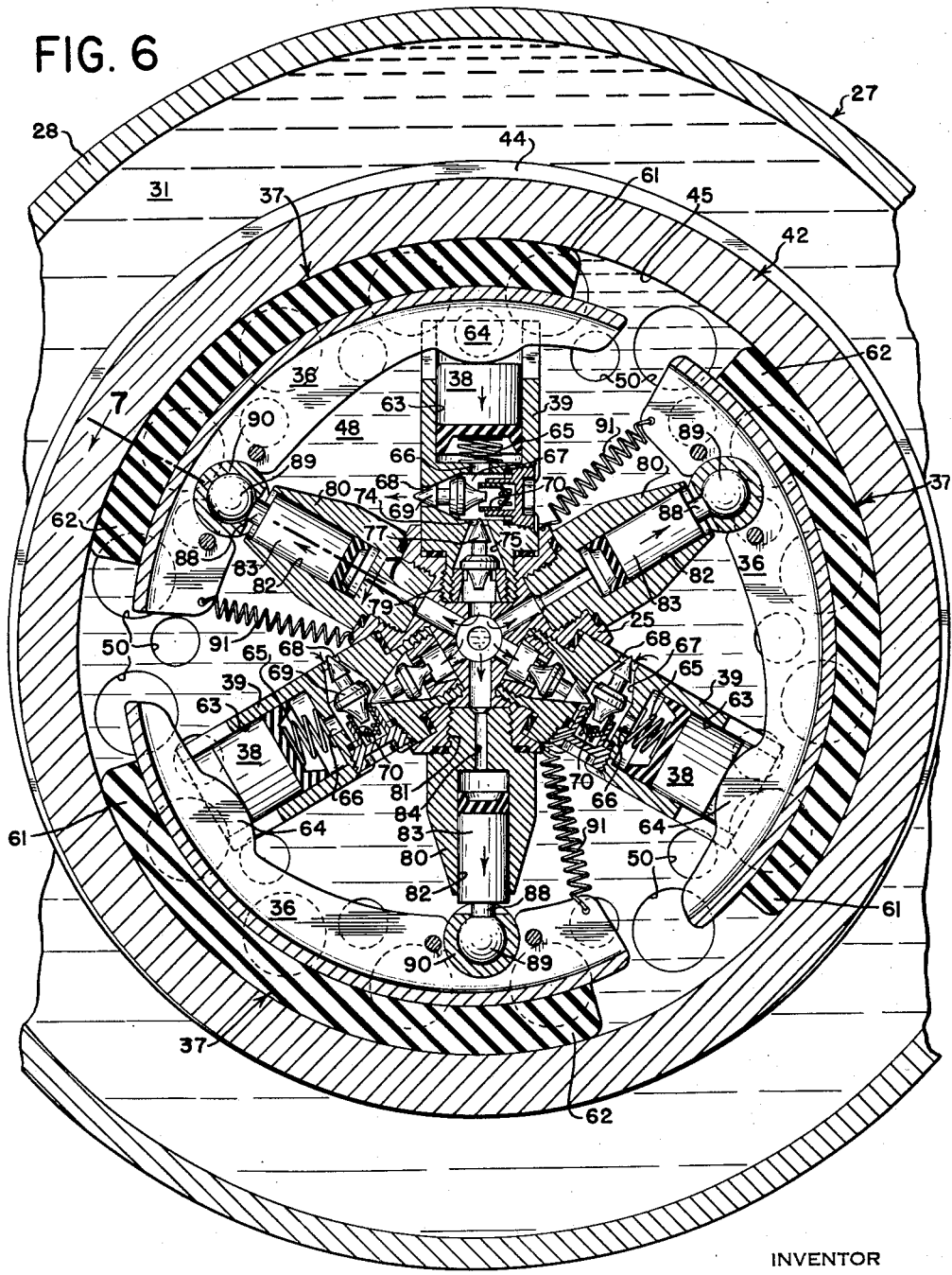
Figure 10:
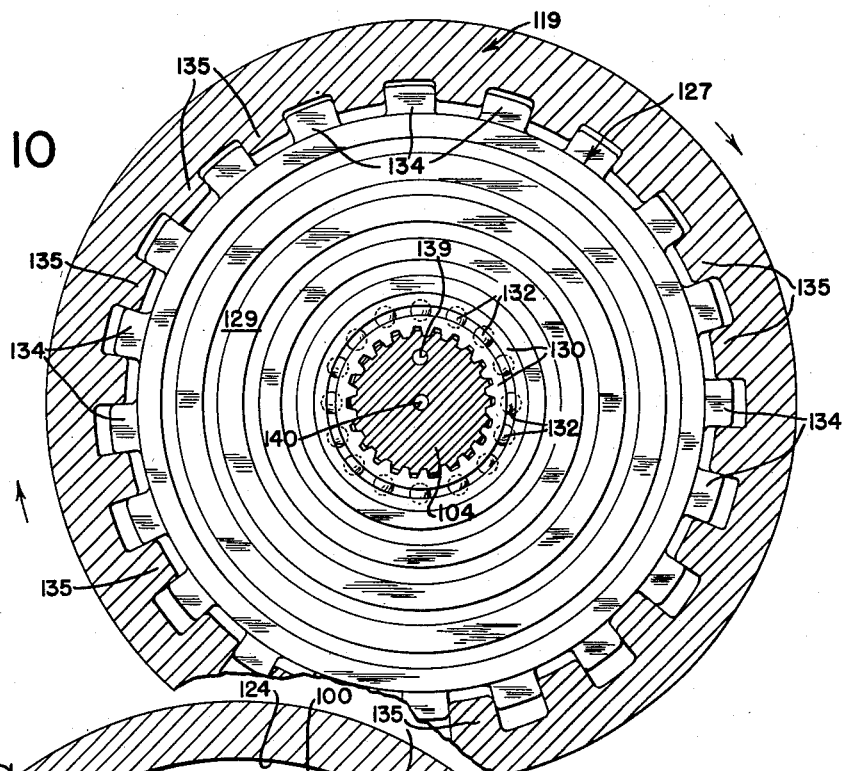
Figure 11:
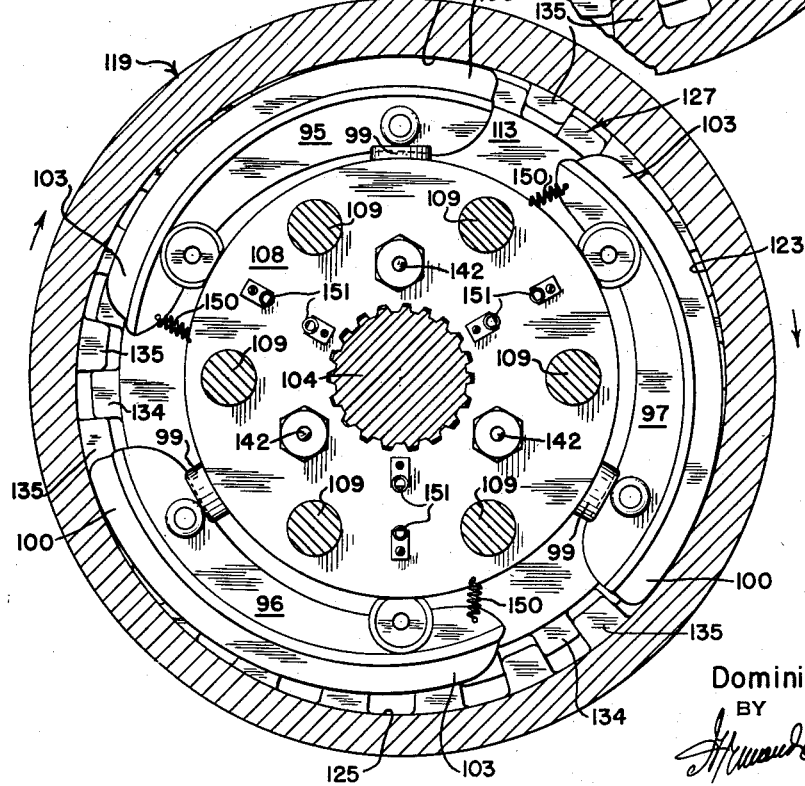
Figure 12:
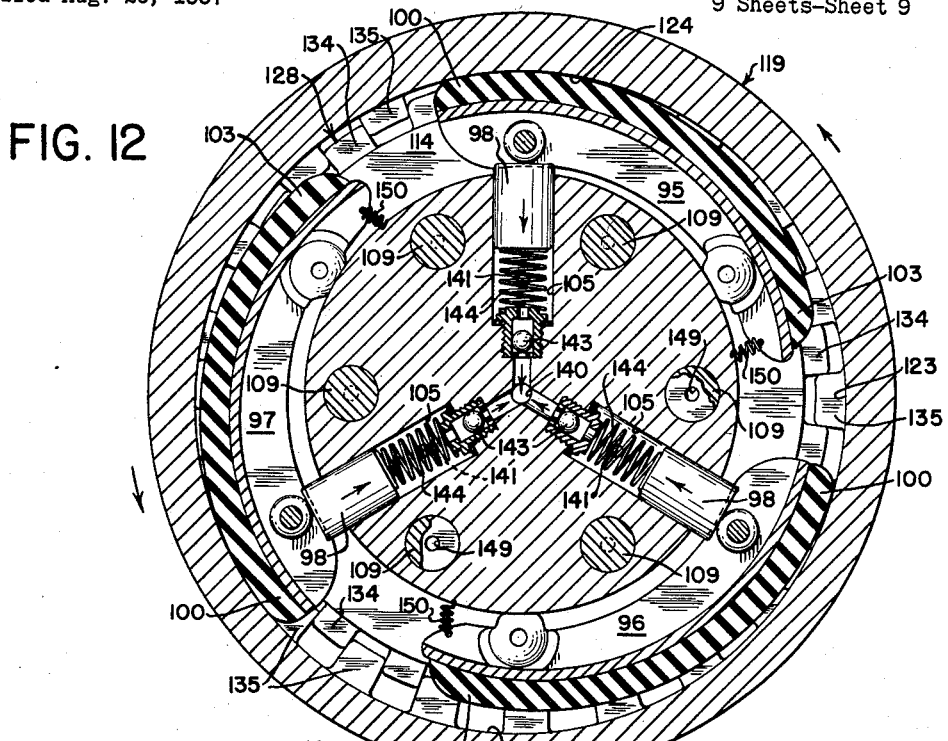
Figure 13:
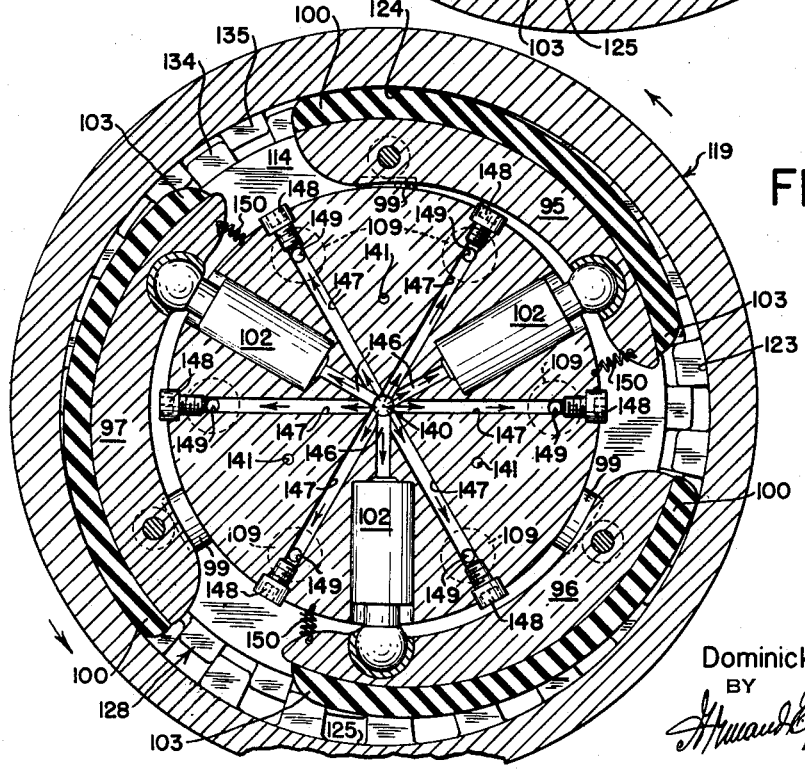

Fig. 2 is a section at 2—2 of Fig. 1;
Fig. 3 is a section at 3—3 of Fig. 1;
Fig. 4 is a section at 4—4 of Fig. 1;
Fig. 5 is a view illustrating operative relationship of parts;
Fig. 6 illustrates operative relationship of parts during braking;

Fig. 7 is a section at 7—7 of Fig. 6;
Fig. 8 is a section at 8—8 of Fig. 7;
Fig. 9 shows a modification of my braking mechanism, with only the brake drum and components interior thereto being shown, it being understood that such modification could replace the comparable elements in Fig. 1;
Fig. 10 is a section at 10—10 of Fig. 9;
Fig. 11 is a section at 11—11 of Fig. 9;
Fig. 12 is a section at 12—12 of Fig. 9; and
Fig. 13 is a section at 13—13 of Fig. 9.

Figure 1A:
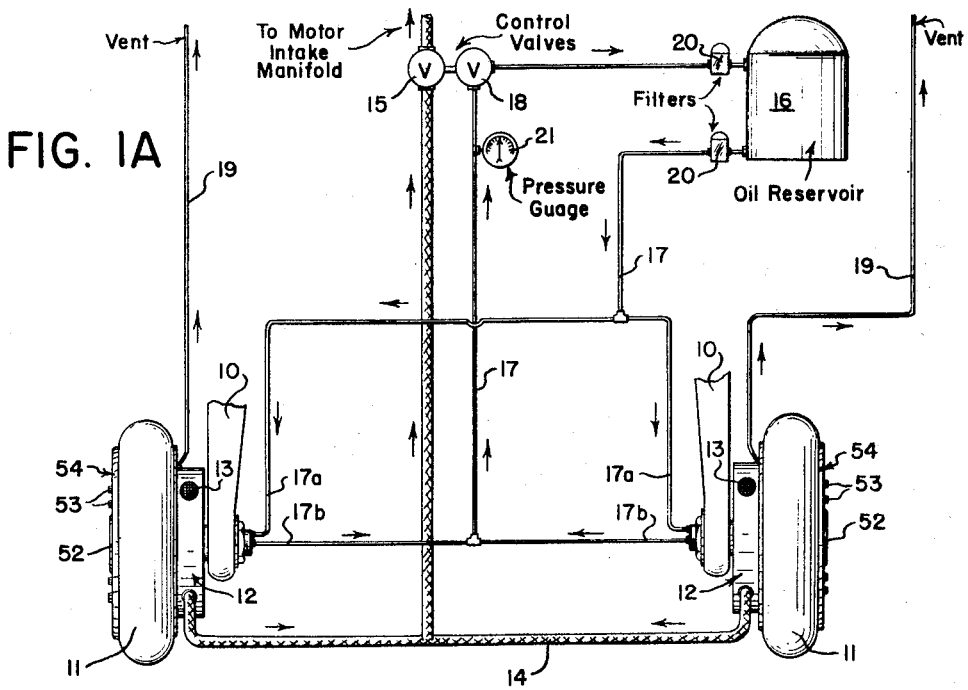
Fig. 1A is a schematic representation showing an embodiment of my braking mechanisms mounted on a vehicle.

The embodiment of my invention illustrated in the drawings may best be understood if consideration is first directed to Fig. 1A, which shows schematically the components in an airplane required in the operation of my spinning wheel-hydraulic braking system. Portions only of struts 10 are shown, for the struts form a part of the landing gear assembly in the aircraft in conventional manner. Mounted on the struts are tires 11 within which are disposed the operating elements of my hydraulic braking mechanism, and interposed between tires 11 and struts 10 are housings 12 within which are mounted the impellers which operate the spinning wheel elements of my invention. In each housing 12 appears a port 13 to an air intake to such housing. Further in Fig. 1A is shown tubing 14 serving to interconnect the interiors of housings 12 to the motor intake manifold of the engine, which, being of conventional construction is not shown. The arrows alongside tubing 14 point out the direction of flow of air from the housings 12 to the engine, and a valve 15 is shown in tubing 14 whereby such flow of air may be regulated.

Turning now to the interrelationship of my hydraulic braking system to the aircraft as illustrated in Fig. 1A, there is a reservoir 16 for fluid, and tubing 17 which serves to carry the fluid which courses between the reservoir 16 and the hydraulic braking system within tires 11. The arrows alongside such tubing indicate the direction of flow of fluid carried thereby, and a valve 18 is shown in the tubing 17 to regulate the flow of fluid. Venting lines 19 extend from the hydraulic braking mechanism to provide an escape route for accumulations of air from the braking mechanism. Filters 20 and a pressure gage 21 are disposed in tubing 17. It should be observed that valve 15 in the tubing 14 of the spinning wheel system, and valve 18 in the tubing 17 of the hydraulic braking system are situated close together for optional operation by a single control, since regulation of flow in the two lines is interrelated.

The remaining figures of the drawings show the details of the spinning wheel and hydraulic braking mechanisms, whose integration broadly into the aircraft may be understood from the preceding description. Fig. 1 shows the details of construction within the area at the lower right of Fig. 1A. Thus, in Fig. 1 are again seen the strut 10, tire 11, impeller housing 12, air carrying tubing 14, and fluid carrying tubing 17. The cylinder shaft 25 having a splined portion 26 is mounted into the strut 10 by such splines, so that the shaft is non-rotatable yet removable relative to strut 10. The remaining components of the structure may now best be outlined by grouping those mounted on the cylinder shaft 25, and hence being non-rotatable, and those which are adapted to rotate about said shaft. Thus, fixed in position relative to shaft 25 is the housing 27, it being realized that what has heretofore been designated the impeller housing 12 comprises a portion of the housing generally 27. The remaining portion 28 of the housing 27 encloses the hydraulic braking system. On either side of portion 28 are end plates 29 and 30 which function to seal off a chamber 31 for fluid within portion 28 of the housing 27 within which the braking system operates. Fluid seals 32 and 33 aid in sealing such chamber despite the contiguity between rotating elements and the stationary walls of the fluid chamber 31. A vent 34 extends into chamber 31 to permit the escape of entrapped air therefrom.

Also stationary, being mounted directly upon the shaft 25, are the internal components of the hydraulic braking system, which in Fig. 1 may be identified as a brake shoe 36 having a liner 37 interconnected to a piston 38 within a cylinder casing 39, together with other components within said cylinder structure which hereafter will be more fully described. It should be noted that fluid tubing 17 has an incoming lead 17a from the fluid reservoir 16 and an exit lead 17b. These leads conduct fluid to and from channels 40 and 41 respectively, which are bored into cylinder shaft 25, the fluid following the direction of the arrows within such channels.

Moving on to the rotating components of the mechanism as shown in Fig. 1, brake drum 42, within fluid chamber 31, encloses the stationary internal braking components heretofore identified. The external surface 43 of the drum 42 is cut back to leave projecting vanes 44, as seen at the top of the drum in Fig. 1, such external surface gradually building up, so that at the bottom of the drum as seen in Fig. 1, the level of such external surface merges with the vanes 44. Such construction provides vanes which aid in cooling, and by the arrangement described, the drum is balanced, for as will hereafter be described, the interior surface 45 of the brake drum is shaped to provide a cam, and would therefore throw the brake drum off balance were no compensation made. The brake drum 42 is supported for rotation relative to the housing 27 by ball bearings 46, and relative to the shaft 25 by ball bearings 47.

The brake drum 42 is constructed with side plates 48 and 49 comprising the sides thereof, and fluid may freely pass between the fluid chamber 31 and the interior of the brake drum through passageways 50.

Bolted to the brake drum 42 by means of bolts 51 is hub plate 52, and secured to the hub plate by means of bolts 53 for easy removal, is wheel 54. A ball bearing 55 permits rotation between the hub plate 52 and shaft 25. The wheel 54 has a flange 56 upon which tire 11 is mounted, and ball bearings 57 are interposed between the flange 56 and the housing 27 to aid in rotation. At the other side of brake drum 42, within impeller housing 12, is the impeller hub 58 which is bolted to the brake drum. Mounted upon the impeller hub 58 are the blades 59 of the impeller. The air tubing 14 leads from the impeller housing 12 to the motor intake manifold. It may be recalled that there is present in the impeller housing 12 a port 13, as seen in Fig. 1A, as well as a valve 15. A system is therefore provided whereby rotation may be imparted to rotatable elements in the structure when valve 15 is open, for movement of air into port 13, and exhaust through the tube to the motor intake manifold, will cause the impeller, and hence wheel 54, to rotate. When it is desired to brake rotation of the wheel, valve 15 is closed so that undue stress is not imposed on the impeller blades.

Figs. 4, 5, and 6 illustrate the details of the component parts of the hydraulic braking system as well as the operation thereof. As already stated herein, the internal components, brake shoes 36, cylinders and pistons are stationary, being mounted on cylinder shaft 25, while the brake drum rotates about them. Exit channel 41 is seen at the center of the cylinder shaft in Figs. 4–6. As may also be seen in Figs. 4 and 6, there are three brake shoes present in the embodiment of the device illustrated in the drawings, and associated with each brake shoe are two cylinders and mating pistons. Since the elements associated with the brake shoes are identical for all brake shoes, a study of one will suffice for all. Brake drum 42 when rotating moves in a clockwise direction as indicated by the arrows in Figs. 4 and 5, and during such rotation, periodic contact is made by the internal surface 45 thereof, with the "toe" portion 61 of brake shoe, while the portion of the brake shoe being then held out of contact with surface 45 is denominated the "heel" portion 62. It will be understood that "toe" and "heel" are simply convenient terms to distinguish the ends of the brake shoe.

Opposite the "toe" portion 61 is the cylinder casing 39, piston 38 being slidable within the cylinder bore 63, piston 38 being driven by protuberance 64 on the brake shoe 36. Extending between the bottom of the piston 38 and the bottom of cylinder bore 63 is a spring 65. There is an aperture 66 extending between the cylinder bore 63 and an intermediate chamber 67. There is an aperture 68 in the side of the cylinder casing 39 which aperture 68 also opens into intermediate chamber 67, and check valve 69 is adapted either to seal off aperture 68, or to move into engagement with retainer 70, permitting passage of fluid through aperture 68.

There is also an aperture 74 communicating between intermediate chamber 67 and lower chamber 75, and finally an aperture 76 between lower chamber 75 and exit channel 41. The check valve 77 can either seal aperture 74 or move away therefrom to be seated on porous retainer 78. In this latter position, fluid can move from intermediate chamber 67 through lower chamber 75 into the exit channel 41. It will be seen that the entire cylinder casing 39 may be removed from engagement with the cylinder shaft 25 by unscrewing threads 79.

Opposite the "heel" portion 62 of the brake shoe liner 37 is a second cylinder casing 80 which is also removably mounted in the cylinder shaft 25 by means of threads 81. In the second cylinder casing 80 is a cylinder bore 82 within which piston 83 can slide, there being a direct channel 84 between the bottom of the cylinder bore 82 and the exit channel 41. A piston rod 88 interconnects piston 83 and a knob 89 mounted for universal movement in a holder 90, in brake shoe 36. A spring 91 normally urges the "heel" portion 62 of the brake shoe toward the cylinder shaft 25.

The parts of the braking mechanism now having been identified, it is possible to proceed to a description of their operation. The braking system is operative when those parts heretofore identified as rotatable are in motion, and more specifically, brake drum 42 must be in motion for operation. In addition valve 18 in fluid tubing 17 is open, and fluid chamber 31 and braked rum 42 are filled with fluid. The interior surface 45 of the brake drum 42 moves as a cam past the brake shoe liners 37, the surface 45 having a high point and a low point. Normally, the "heel" portion of the brake shoe liner is held out of contact with surface 45 by spring 91, but the action of spring 65 against piston 38, which bears against protuberance 64, assures that the "toe" portion 61 of the brake shoe liner 37 is in contact with surface 45.

In Fig. 4, the normal situation prevails, and the brake drum in rotating has just reached the position where the high point of surface 45 is at the top of the drawing. Surface 45 then exerts a downward force against piston 38 which moves in the direction of the arrow in Fig. 4. This motion forces fluid downward through aperture 66 in the bottom of cylinder bore 63, and this fluid motion causes valve check 69 to seal side aperture 68, and thrust check valve 77 away from aperture 76 to position upon porous retainer 78, whereby fluid pushed out of cylinder bore 63 by piston 38 reaches the exit channel 41.

As brake drum 42 continues rotating in the direction of the arrow in Fig. 4, the high point of surface 45 moves away from brake shoe liner 37, and the low point of surface 45 reaches a position over the "toe" portion 61 of the brake shoe liner. This situation is depicted in Fig. 5. Under the influence of spring 65, the piston 38 began moving upward in the direction of the arrow in Fig. 5 as the high point of surface 45 moved past the "toe" of the brake shoe liner, and, in Fig. 5, has reached the point of maximum extension when the low point of surface 45 is over the toe. During this stroke of piston 38, check valve 69 moves away from side aperture 68, and check valve 77 seals aperture 76. Oil is then drawn into the cylinder bore 63 through side aperture 68, intermediate chamber 67 and aperture 66, preparatory to the next downward stroke of piston 38.

It will be understood that this same pumping cycle occurs as the high and low points of surface 45 successively move past each of the three brake shoe liners in the braking mechanism shown in the drawings. By this action it is obvious that as brake drum 42 rotates, a circulation of fluid is caused, out of the braking system to the reservoir 16 through exit channel 41, and from the reservoir 16 into the braking system through inlet channel 40. A cooling system may preferably be associated with the reservoir 16 in order that fluid passing therethrough will be cooled, this effect being especially desirable after heat is generated during braking.

To stop rotation of wheel 54, and the remaining rotating parts heretofore enumerated, the valve 18 in fluid tubing 17 is closed. Simultaneously valve 15 in the air tubing 14 is also closed so that there will be no stress on the impeller blades 59 during the process of braking. The closing of valve 18 prevents any movement of fluid out of the braking system. Meanwhile, the brake drum has been rotating until the valve 18 is closed, and continues thereafter, for it is the brake drum which activates the braking mechanism, although full braking may occur after only a very small amount of rotation once valve 18 is closed. What happens during braking is shown in Fig. 6 where the high point of surface 45 is at the top of the drawing. Thus, pressure is exerted against piston 38 which forces fluid downwardly through aperture 66, intermediate chamber 67, aperture 74, lower chamber 75 and aperture 76. Since fluid cannot be led away through exit channel 41, the valve 18 being closed, it follows a path into the respective second cylinder casings 80 through channels 84, and into cylinder bores 82, forcing the pistons 83 upwardly to press the brake shoe liners 37 into contact with the surface 45, and thus halt rotation through the exertion of frictional force upon surface 45. It is apparent that braking may be gradual, by gradually closing valve 18, in which case part of the fluid pumped by piston 38 may still pass into exit channel 41, and only a part acts to force pistons 83 outwardly. Alternatively, braking may be complete and sudden, when valve 18 is fully closed at once, when all fluid pumped by piston 38 acts upon pistons 83.

After braking has occurred, to release the brakes, valve 18 is opened, whereupon spring 91 will draw the "heel" portion 62 of the respective brake shoe liners out of contact with surface 45.

In the course of repeated braking, there may be a tendency for uneven wear upon the respective brake shoe liners. It is for this reason that piston 83 is interconnected to the brake shoe 36 through piston rod 88 which terminates in knob 89 which is universally mounted within holder 90 in the brake shoe. By this expedient, even if the liner 37 wears unevenly, when the brakes are applied, the brake shoe liner will have the maximum amount of surface possible forced into contact with surface 45. Because protuberance 64 is not fastened to piston 38, upon extension of piston 83, which is universally mounted in the brake shoe, where the brake shoe liner has worn unevenly, such liner is free to automatically orient itself for maximum contact with surface 45 upon extension of piston 83.

Figs. 9–13 are illustrations of a modified embodiment of my invention in which frictional braking force is applied not only through brake shoes to the interior peripheral surface of the brake drum, but also to radial surfaces within the brake drum. Thus, there are present brake shoes 95, 96, and 97. In this embodiment, there are pairs of pistons 98 and 99 which respond to pressures exerted on the toe portion 100 of the respective brake shoes, pistons 98 and 99 being best seen in Figs. 9 and 12. There are also pistons 102 which are associated with the heel portions 103 of the respective brake shoes as may best be seen in Fig. 13. It will be noted that splined shaft 104 in the second embodiment is not of uniform diameter throughout, but has wells 105 and 106 formed therein within which pistons 98 and 99 are slidably mounted, such wells having outer walls 107 and 108 respectively. Extending from such outer walls 107 and 108 are pistons 109 which operate in a direction parallel to shaft 104 to control sideward movement of plates 113 and 114.

The components mentioned in the foregoing paragraph are associated with the splined shaft 104 and do not rotate. Also non-rotatable are end plates 115 and 116 which are threaded onto shaft 104 at 117 and 118 respectively.

Such non-rotatable components coact with rotatable components in the operation of my novel brake. Thus, brake drum 119 is mounted for rotation by means of ball bearing raceways 120 and ball bearings 121. In the embodiment of Figs. 9–13, as with the embodiment earlier described, the exterior surface of the brake drum 119 has vanes 122, the height of which gradually diminishes, as seen in Fig. 9, from the top of the brake drum to the bottom, where the vanes have merged into the exterior surface of the brake drum 119. Such expedient on the exterior surface of the brake drum serves not only to aid in cooling the brake drum, but also to counterbalance the brake drum, which would otherwise be unbalanced by reason of the eccentric interior surface 123 having a high point 124 at the top of Fig. 9 and a low point 125 at the bottom of Fig. 9, by reason of which such interior surface furnishes camming action in cooperation with the brake shoes 95, 96, and 97. Also rotatable about shaft 104 are backing plates 127 and 128, which are faced on either side with grooved, resilient braking material 129. Such backing plates are made rotatable by reason of raceways 130 and 131 having ball bearings 132 and 133 therebetween, respectively, and because the circumferential edges of such backing plates 127 and 128 have teeth 134 which intermesh with teeth 135 on the interior surface 123 of brake drum 119. It will be noted that the rotatable backing plate 127 is mounted between non-rotatable plate 113 and end plate 115, while rotatable backing plate 128 is mounted between non-rotatable plate 114 and end plate 116. Thus, by the action of side pistons 109, and the lateral movability provided by the lateral extent of teeth 135 in the brake drum, when plates 113 and 115 for backing plate 127, and plates 114 and 116 for backing plate 128 are forced into contact with the respective backing plates, the braking effect in the structure will be enhanced.

The remaining components in the embodiment of Figs. 9 to 13, which have not yet been identified, may best be identified in the ensuing description of operation of this modified embodiment. It will be understood that prior to braking, the brake drum 119 and other parts indicated to be rotatable, will be rotating about shaft 104, as was the case in the earlier embodiment described. A flow of fluid, as oil or other suitable fluid, is set up during such rotation, the fluid entering the interior of the brake drum 119 through ingress passageway 139 in shaft 104, the fluid flowing thereto from a reservoir, not shown, and leaving the interior of the brake drum through egress passageway 140 to return to the reservoir. A circulation of fluid is caused by a pumping action caused by rotation of the brake drum 104, having eccentric inner surface 123 by way of a cam, past brake shoes 101, the high point 124 exerting a downward pressure against the toe portion 100 of each respective brake shoe as it passes such brake shoe.

When a downward pressure is exerted on a brake shoe, as for brake shoe 95 in Fig. 9, the pistons 98 and 99 are depressed as indicated by the arrows in Fig. 9. The wells 105 and 106 in which pistons 98 and 99 respectively slide are filled with oil, the pressure in each being the same by reason of connecting passage 141 between the wells. When pistons 98 and 99 are depressed, valve 142 closes to block escape of fluid except to egress passage 140, and valve 143 opens to permit flow of fluid into passage 140. After the high point 124 has passed by toe portion 100 of brake shoe 95, the springs 144 and 145 cause the respective pistons 98 and 99 to move upwardly, such upward movement causing valve 142 to open to admit fluid into wells 105 and 106, and valve 143 to close, to prevent intake of fluid into wells 105 and 106 from egress passage 140. In this manner a circulation of fluid is maintained.

To brake the structure, a valve as at 18 in Fig. 1 is closed to block the flow of fluid between the reservoir and passages 139 and 140. When this occurs, and high point 124 of inner surface 123 of the brake drum 119 depresses pistons 98 and 99, the fluid in wells 105 and 106 cannot escape into egress passage 140, but instead flows into radial passages 146, best seen in Fig. 13 causing outward movement of pistons 102 and consequent movement of heel portions 103 of the brake shoes 95, 96, and 97 into contact with inner surface 123 of the brake drum. Thus, the brake shoe over its whole extent is brought into frictional contact with such inner surface to effect braking. But the fluid as well flows into radial passages 147, best seen in Fig. 13. The passages 147 are blocked at their ends with plugs 148, and the fluid then flows into apertures 149 to cause sidewise displacement of side pistons 109. Such sidewise displacement of pistons 109 causes sidewise displacement of plates 113 and 114 (see Fig. 9) bringing such plates first into contact with braking material 129 on the backing plates 127 and 128, such contact further causing sidewise displacement of plates 127 and 128 until end plates 115 and 116 respectively are contacted, whereupon the braking material lines backing plates 127 and 128 are sandwiched between non-rotatable plates 113 and 115, and 114 and 116 respectively. Now both the brake shoes 95, 96, and 97, and braking material lined backing plates 127 and 128 are acting to provide braking.

When it is desired to terminate the braking action, the valve as at 18 in Fig. 1A is reopened to permit resumption of flow of fluid between the reservoir and ingress and egress passages 139 and 140. Springs 150 retract heel portions 103 of the respective brake shoes out of contact with inner surface 123 of the brake drums 119. Likewise, springs 151 retract the plates 113 and 114 out of contact with the braking material 129, so that backing plates 127 and 128 may resume their rotation.

I claim:

1. A hydraulic brake for a rotatable body comprising a rotatable cam, pumping means operable by said cam, fluid within said brake, a conduit for said fluid, a valve in said conduit, a frictional surface, a mating surface for said frictional surface and a piston operable by said pumping means to bring said frictional surface into contact with said mating surface, said pumping means circulating fluid through said conduit during rotation of said cam when said valve is open, and extending said piston to bring said frictional surface into contact with said mating surface when said valve is closed including a rotatable brake drum, said cam being an interior eccentric peripheral surface of said brake drum.

2. A hydraulic brake for a rotatable body comprising a rotatable brake drum, a cam provided by an interior eccentric peripheral surface of said brake drum, pumping means operable by said cam, fluid within said brake, a conduit for said fluid, a valve in said conduit, a frictional surface, and a piston operable by said pumping means to bring said frictional surface into contact with said mating surface, said pumping means circulating fluid through said conduit during rotation of said cam when said valve is open, and extending said piston to bring said frictional surface into contact with said cam when said valve is closed.

3. A hydraulic brake for a rotatable body comprising a rotatable brake drum, a cam provided by an interior eccentric peripheral surface of said brake drum, fluid within said brake, a conduit for said fluid, a valve in said conduit, pumping means, a piston operable by said pumping means, a brake shoe having a toe portion and a heel portion, and a frictional surface, said pumping means being associated with said toe portion and said piston being associated with said heel portion, and means for maintaining said toe portion in contact with said cam whereby substantially radial motion is imparted to said toe portion during rotation of said cam for operation of said pumping means, said pumping means circulating fluid through said conduit during rotation of said cam when said valve is open and extending said piston to bring said heel portion into contact with said cam when said valve is closed.

4. A hydraulic brake as claimed in claim 3 including means for maintaining said heel portion out of contact with said cam when said valve is open.

5. A hydraulic brake as claimed in claim 3 including a spring for maintaining said heel portion out of contact with said cam when said valve is open.

6. A hydraulic brake as claimed in claim 3 including means for universally interconnecting said piston and said heel portion of said brake shoe.

7. A hydraulic brake as claimed in claim 3 including a ball joint between said piston and said heel portion of said brake shoe.

8. A hydraulic brake as claimed in claim 3 wherein said pumping means comprises a cylinder and a second piston within said cylinder, said toe portion bearing upon said second piston, and said means for maintaining said toe portion in contact with said cam comprises a spring within said cylinder, said spring urging said second piston outwardly in said cylinder.

9. A hydraulic brake for a body rotatable about a shaft, comprising a brake drum rotatably mounted on said shaft, a cam provided by an interior eccentric peripheral surface of said brake drum, fluid within said brake, a conduit for said fluid, a valve in said conduit, first and second cylinders radially mounted on said shaft, first and second pistons respectively slidable within said cylinders, a brake shoe having a toe portion and a heel portion, said first piston being interconnected with said heel portion and being hydraulically operable by said second piston, and said second piston bearing against said toe portion, and a spring within said second cylinder urging said second piston outwardly, whereby said toe portion is maintained in contact with said cam and said second piston will operate as a pump during rotation of said cam, said second piston circulating fluid through said conduit during rotation of said cam when said valve is open, and extending said first piston to bring said heel portion into contact with said cam when said valve is closed, and a spring means for maintaining said heel portion out of contact with said cam when said valve is open.

10. A hydraulic brake as claimed in claim 9 including a radial frictional surface mounted upon said shaft, a mating surface for said radial frictional surface, a third cylinder mounted parallel to said shaft, and a third piston slidable within said third cylinder, said third piston being hydraulically operable by said second piston to control the proximity of said radial frictional surface and said mating surface, said second piston also extending said third piston to bring said radial frictional surface and said mating surface into contact when said valve is closed, and second spring means to maintain said radial frictional surface and said mating surface out of contact when said valve is open.

11. A hydraulic brake for a body rotatable about a shaft, comprising a rotatable brake drum, a cam provided by an interior eccentric peripheral surface of said brake drum, pumping means operable by said cam, fluid within said brake, a conduit for said fluid, a valve in said conduit, a first frictional surface circumferentially mounted relative to said shaft, a second frictional surface radially mounted upon said shaft, a mating surface for said second frictional surface, and pistons operable by said pumping means, said pumping means circulating fluid through said conduit during rotation of said cam when said valve is open, and extending said pistons to bring said first frictional surface into contact with said cam, and said second frictional surface and said mating surface therefore into contact when said valve is closed.

References Cited in the file of this patent

UNITED STATES PATENTS

| | | |
|---|---|---|
| 1,912,953 | Staats | June 6, 1933 |
| 2,304,907 | Goodson et al. | Dec. 15, 1942 |
| 2,372,207 | Kendrick | Mar. 27, 1945 |
| 2,419,113 | Bricker | Apr. 15, 1947 |
| 2,670,827 | Sanders | Mar. 2, 1954 |
| 2,719,620 | McDonald | Oct. 4, 1955 |
| 2,788,094 | Knowles | Apr. 9, 1957 |

FOREIGN PATENTS

| | | |
|---|---|---|
| 515,251 | Italy | Feb. 14, 1955 |